US012590030B2

(12) United States Patent
Leblanc

(10) Patent No.: US 12,590,030 B2
(45) Date of Patent: Mar. 31, 2026

(54) VAULTS, LIDS AND TRENCHES USING RECYCLED POLYSTYRENE

(71) Applicant: Oldcastle Infrastructure, Inc., Atlanta, GA (US)

(72) Inventor: Charles Leblanc, Candiac (CA)

(73) Assignee: Oldcastle Infrastructure, Inc., Atlanta, GA (US)

( * ) Notice: Subject to any disclaimer, the term of this patent is extended or adjusted under 35 U.S.C. 154(b) by 967 days.

(21) Appl. No.: 17/369,701

(22) Filed: Jul. 7, 2021

(65) Prior Publication Data

US 2022/0009833 A1     Jan. 13, 2022

Related U.S. Application Data

(60) Provisional application No. 63/049,014, filed on Jul. 7, 2020.

(51) Int. Cl.
*C04B 18/20*          (2006.01)
*B28B 3/00*          (2006.01)
(Continued)

(52) U.S. Cl.
CPC .............. *C04B 18/20* (2013.01); *B28B 3/022* (2013.01); *B28B 3/06* (2013.01); *C04B 14/06* (2013.01);
(Continued)

(58) Field of Classification Search
CPC ......... C04B 18/20; C04B 14/06; C04B 20/04; C04B 20/1033; C04B 28/02; C04B 40/0042; C04B 40/0046; C04B 2111/00784; C04B 2201/00784; C04B 2201/50; C04B 16/08; C04B 26/06; B28B 3/022; B28B 3/06; B28B 23/0081; Y02W 30/62
See application file for complete search history.

(56) References Cited

U.S. PATENT DOCUMENTS

2019/0176375 A1     6/2019  Burke et al.

FOREIGN PATENT DOCUMENTS

CA          3043240          9/2018
CN     101265051 B  * 11/2010  ............. C04B 26/18
(Continued)

OTHER PUBLICATIONS

CN_101265051_Original (Year: 2010).*
(Continued)

*Primary Examiner* — Amber R Orlando
*Assistant Examiner* — Anastasia A. Kuvayskaya
(74) *Attorney, Agent, or Firm* — Sheridan Ross P.C.

(57)          ABSTRACT

Methods, compositions, and apparatuses are provided herein that utilize polystyrene from recycled products to make a high strength composite concrete that can be used for subgrade utility vaults, utility trenches, etc. Polystyrene is a widely-used plastic that can be collected and then densified at particular parameters including temperature to transform the polystyrene to a usable form. Then, the densified polystyrene is combined with other resin materials and dry materials to form a high-strength concrete material. The amount of densified polystyrene that is combined with the other materials is critical to control shrinkage and expansion of the concrete material during manufacturing.

20 Claims, 6 Drawing Sheets

(51) Int. Cl.

| | | |
|---|---|---|
| *B28B 3/02* | (2006.01) | |
| *B28B 3/06* | (2006.01) | |
| *C04B 14/06* | (2006.01) | |
| *C04B 20/04* | (2006.01) | |
| *C04B 20/10* | (2006.01) | |
| *C04B 28/02* | (2006.01) | |
| *C04B 40/00* | (2006.01) | |
| *C04B 111/00* | (2006.01) | |

(52) U.S. Cl.

CPC .......... *C04B 20/04* (2013.01); *C04B 20/1033* (2013.01); *C04B 28/02* (2013.01); *C04B 40/0042* (2013.01); *C04B 40/0046* (2013.01); *C04B 2111/00784* (2013.01); *C04B 2201/50* (2013.01)

(56) References Cited

FOREIGN PATENT DOCUMENTS

| CN | 110183161 A | * | 8/2019 | ............. C04B 28/00 |
|---|---|---|---|---|
| JP | 2001030242 A | * | 2/2001 | ............. Y02W 30/62 |
| KR | 102102083 B1 | * | 4/2020 | ........... C04B 20/002 |
| OA | 17742 A | * | 11/2017 | ............. B65D 88/76 |
| WO | WO 2012/109028 | | 8/2012 | |
| WO | WO 2016/094026 | | 6/2016 | |

OTHER PUBLICATIONS

JP_2001030242_A_Machine_Translation (Year: 2001).*
CN_101265051_Machine_Translation (Year: 2010).*
JP_2001030242_Original (Year: 2001).*
OA_17742_A_Original (Year: 2017).*
KR_102102083_Machine_Translation (Year: 2020).*
KR_102102083_Original (Year: 2020).*
CN_110183161_Machine_Translation (Year: 2019).*
CN_110183161_Original (Year: 2019).*
Density of Liquid Water_Table (Year: 2025).*
Official Action for Canada Patent Application No. 3086346, dated Mar. 25, 2022, 5 pages.
Official Action for Canada Patent Application No. 3203269, dated Jul. 18, 2025, 4 pages.

* cited by examiner

VAULTS, LIDS AND TRENCHES USING RECYCLED POLYSTYRENE

CROSS REFERENCE TO RELATED APPLICATIONS

This application claims priority under 35 U.S.C. § 119(e) to U.S. Provisional Patent Application Ser. No. 63/049,014 filed on Jul. 7, 2020 and entitled "Method for Manufacturing Subgrade Utility Vaults, Lids and Trenches Using Recycled Polystyrene," which is incorporated by reference herein in its entirety.

FIELD

The present disclosure relates to the inclusion of recycled polystyrene in a high-strength concrete used for subgrade utility vaults, utility trenches, etc.

BACKGROUND

Polystyrene is one of the most widely used plastics due to its versatility and can be produced as a solid, a sheet, a foam, and many other forms. Due to its widespread use, polystyrene also represents a large quantity of waste. More than 14 million tons of polystyrene are thrown away in the world each year, and over 25 billion polystyrene cups are thrown away in the United States every year.

Recycling is one possible solution to this waste problem, but there are several economic and technical hurdles that prevent polystyrene from being easily recycled. Some forms of polystyrene are extremely porous such that a product made from polystyrene is up to 95% air by volume. Thus, shipping polystyrene is not efficient, and the amount of polystyrene produced from a recycling process is low. Other issues include food contamination and other contamination from the use of polystyrene as a container as well as the limited number of times that polystyrene can be recycled before the resulting material is too degraded to safely use in further products.

As a result, much of the polystyrene used in various products is thrown away in landfills where the polystyrene can take hundreds of years to fully degrade. Perhaps worse is the pollution of polystyrene in the oceans where the pollution is not localized and completely permeates and disrupts the ecosystems in the oceans. As a further alternative, some cities and municipalities have turned to incineration, but this simply moves the pollution from the land and oceans to the atmosphere. Thus, there is a need for a process to recycle and/or dispose of polystyrene in a safe and productive manner.

Turning to concrete materials, low profile additives are mixed with resin for a number of benefits when combining the resin with other materials to form a high-strength concrete. Low profile additives reduce the weight of the concrete material, improve the surface smoothness of a final concrete product, and control the shrinkage resulting from the molding of the final concrete product. Examples of low profile additives include polyvinyl acetate, polymethyl methacrylate, and polystyrene.

SUMMARY

The present disclosure provides a method for manufacturing a high-strength concrete that incorporates recycled polystyrene in a manner that addresses the above recyclability and pollution concerns. The recycled polystyrene is densified and incorporated into a resin component in a specific proportion such that the recycled polystyrene complements or serves a similar role as a low profile additive. The resin component is mixed with a dry component to form the concrete material that can then be used in a variety of applications such as subgrade utility vaults and trench vaults.

It is an aspect of various embodiments of the present disclosure to provide a method for processing recycled polystyrene before incorporating the polystyrene into a resin component of the concrete material. The polystyrene is collected from various sources and can be segregated by color, size, density, or other characteristics. Then, the collected polystyrene can be shredded to standardize the size of the pieces of polystyrene and to promote the densification of the polystyrene. Next, the polystyrene is densified at an elevated temperature to increase the density of the polystyrene for structural applications like a subgrade utility vault or utility trench. The densification can occur between approximately 140° C. and 160° C., in some embodiments 130° C., 135° C., 140° C., 145° C., 150° C., 155° C., 160° C., 165° C., and 170° C., or a range or value between two of these values. The term "approximately" can mean a variation of +/−10% on a relative basis. In some embodiments, the elevated temperature is approximately 150° C. These temperatures are high enough to melt and densify the polystyrene as well as remove butane or pentane but not too high to break the molecular chains of the polystyrene and reduce the strength of the polystyrene. The densified polystyrene can be ground to smaller pieces for further processing.

It is another aspect of embodiments of the present disclosure to provide a manufacturing process that controls the expansion and/or contraction of the concrete material during manufacturing. The concrete material can expand and/or contract when the concrete material is poured into a mold and cures. Too much expansion and/or contraction can warp the outer surface of the final product and diminish the appearance of the final product. Moreover, too much expansion and/or contraction can damage the structure of the final product and the mold. The amount of densified polystyrene that is added to a resin component controls the expansion and/or contraction of the concrete material. A small amount of contraction is desirable to help remove the final product from a mold, but any expansion will damage the final product and/or mold. Thus, in some embodiments, the densified polystyrene comprises between approximately 3% to 7% of a weight of a resin component of the concrete material to produce a small amount of contraction, or in some embodiments 3%, 4%, 5%, 6% and 7%, or a range or value between two of these values. In various embodiments, the densified polystyrene comprises approximately 5% of a weight of a resin component of the concrete material to produce a small amount of contraction.

It is a further aspect of embodiments of the present disclosure to provide a batching process for manufacturing and using a concrete material that incorporates recycled polystyrene. In a batching process, the resin and dry components are made separately and then combined in a turbine mixer to produce a discrete amount of concrete material. The concrete material is transported to a mold where the concrete can be pressed and/or cured into a final concrete product. The batching process is in contrast to continuous methods of producing concrete. However, it will be appreciated that the present disclosure encompasses any method of manufacturing concrete, including continuous methods.

It is another aspect of embodiments of the present disclosure to provide a composition of high-strength concrete that incurs the desired effects and benefits described herein. The relative amount of the densified polystyrene and other materials are described with respect to a manufacturing process, however, the composition or product made by this process and that includes recycled polystyrene is also new and novel. The resulting utility vault or utility trench can be described as having a composition with the described relative amounts of materials and/or made by a process with the described relative amounts of materials, including densified polystyrene.

One particular embodiment of the present disclosure is a method of manufacturing high-strength concrete with recycled polystyrene, comprising (i) collecting polystyrene from recycled products; (ii) densifying the polystyrene at an elevated temperature between approximately 140° C. to 160° C. to melt the polystyrene and to increase a density of the polystyrene; (iii) mixing the densified polystyrene with a monomer material and at least one other resin material to form a resin component, wherein the densified polystyrene comprises between approximately 3% to 7% of a weight of the resin component; and (iv) mixing the resin component with a dry component to form a high-strength concrete.

In some embodiments, the elevated temperature is approximately 150° C. In various embodiments, the densified polystyrene comprises approximately 5% of the weight of the resin component. In some embodiments, the dry component comprises an aggregate material and a sand material, and the aggregate material is between approximately 60% to 80% of a weight of the dry component, or in some embodiments 60%, 65%, 70%, 75%, and 80%, or a range or value between two of these values. In various embodiments, the dry component comprises an aggregate material and a sand material, and the sand material is between approximately 20% to 40% of a weight of the dry component, or in some embodiments 20%, 25%, 30%, 35%, and 40%, or a range or value between two of these values. In some embodiments, the monomer material comprises between approximately 40% to 50% of the weight of the resin component, or in some embodiments 40%, 42%, 45%, 47%, and 50%, or a range or value between two of these values. In various embodiments, the monomer material is a styrene monomer that is between approximately 40% to 50% of the weight of the resin component, in some embodiments 40%, 42%, 45%, 47%, and 50%, or a range or value between two of these values.

In some embodiments, the method further comprises (v) shredding the recycled polystyrene from a first average particle size to a smaller second average particle size. In various embodiments, the method further comprises (vi) grinding the densified polystyrene into flour with an average particle size of between approximately 0.15 mm and 1 mm, or in some embodiments 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, and 1.0 mm, or a range or value between two of these values.

Another particular embodiment of the present disclosure is a method of manufacturing a high-strength concrete product with recycled polystyrene, comprising: (i) densifying recycled polystyrene at an elevated temperature to melt the polystyrene and to increase a density of the polystyrene; (ii) mixing the densified polystyrene, a monomer material, and at least one other resin material in a hopper to form a resin component; (iii) mixing an aggregate material and a sand material to form a dry component; (iv) mixing the resin component and the dry component in a turbine mixer to form a concrete material; and (v) pressing the concrete material in a mold to produce a high-strength concrete product with minimal to no expansion.

In various embodiments, the method further comprises (vi) mixing the densified polystyrene, the monomer material, and the at least one other resin material in the hopper for approximately 40 seconds to 50 seconds, or preferably approximately 45 seconds. In some embodiments, the method further comprises (vii) mixing a polymerization catalyst and a coupling agent into the resin component in the hopper for at least 60 seconds. In various embodiments, the polymerization catalyst is a peroxide material, and the coupling agent is a silane material. In some embodiments, the method further comprises (viii) transferring the concrete material from the turbine mixer to the mold in a container. In various embodiments, the method further comprises (ix) inducing a vibration in the mold as the concrete material is pressed in the mold. In some embodiments, the elevated temperature is approximately 150° C., the densified polystyrene comprises approximately 5% of a weight of the resin component, and the aggregate material is between approximately 60% to 80% of a weight of the dry component.

Yet another embodiment of the present disclosure is a high-strength concrete structure made in part from recycled products, comprising: a resin component having a densified polystyrene, a monomer material, and at least one other resin material, wherein the densified polystyrene comprises between approximately 3% to 7% of a weight of the resin component, and wherein the monomer material comprises between approximately 40% to 50% of the weight of the resin component; and a dry component having an aggregate material and a sand material, wherein a weight of the aggregate material is between approximately 60% to 80% of a weight of the dry component, wherein the resin component and the dry component are combined to form a concrete material used to produce the high-strength concrete structure.

In some embodiments, at least one sidewall and a bottom portion of the concrete structure are comprised of high-strength concrete and form at least one of a subgrade utility vault or a utility trench. In various embodiments, the structure further comprises a lid made from a material that is distinct from the high-strength concrete material, wherein the lid at least partially defines a partially enclosed space with the at least one sidewall and the bottom portion. In some embodiments, the at least one other resin material is a silane material that is between approximately 40% to 55% of the weight of the resin component. In various embodiments, the monomer material is a styrene monomer that is between approximately 40% to 50% of the weight of the resin component. In some embodiments, the structure further comprises a pigment material that is mixed with the resin component and the dry component to change a color of the concrete material.

In one embodiment, a method of manufacturing high-strength concrete with recycled polystyrene is provided, the method comprising: collecting polystyrene from recycled products; densifying the polystyrene at an elevated temperature between approximately 140° C. to 160° C. to melt the polystyrene and to increase a density of the polystyrene; mixing the densified polystyrene with a monomer material and at least one other resin material to form a resin component, wherein the densified polystyrene comprises between approximately 3% to 7% of a weight of the resin component; and mixing the resin component with a dry component to form a high-strength concrete.

In some embodiments, the elevated temperature is approximately 150° C. In various embodiments, the densified polystyrene comprises approximately 5% of the weight of the resin component. In some embodiments, the dry component comprises an aggregate material and a sand material, and the aggregate material is between approximately 60% to 80% of a weight of the dry component. In various embodiments, the dry component comprises an aggregate material and a sand material, and the sand material is between approximately 20% to 40% of a weight of the dry component. In some embodiments, the method further comprises shredding the recycled polystyrene from a first average particle size to a smaller second average particle size. In some embodiments, the method further comprises grinding the densified polystyrene into flour with an average particle size of between approximately 0.15 mm and 1.0 mm.

In one embodiment, a method of manufacturing a high-strength concrete product with recycled polystyrene is provided, the method comprising: densifying recycled polystyrene at an elevated temperature to melt the polystyrene and to increase a density of the polystyrene; mixing the densified polystyrene, a monomer material, and at least one other resin material in a hopper to form a resin component; mixing an aggregate material and a sand material to form a dry component; mixing the resin component and the dry component in a turbine mixer to form a concrete material; and pressing the concrete material in a mold to produce a high-strength concrete product.

In some embodiments, the method further comprises mixing the densified polystyrene, the monomer material, and the at least one other resin material in the hopper for approximately 45 seconds. In some embodiments, the method further comprises mixing a polymerization catalyst and a coupling agent into the resin component in the hopper for at least 60 seconds. In various embodiments, the polymerization catalyst is a peroxide material, and the coupling agent is a silane material. In some embodiments, the method further comprises transferring the concrete material from the turbine mixer to the mold in a container. In some embodiments, the method further comprises inducing a vibration in the mold as the concrete material is pressed in the mold. In various embodiments, the elevated temperature is approximately 150° C., the densified polystyrene comprises between approximately 5% of a weight of the resin component, and the aggregate material is between approximately 60% to 80% of a weight of the dry component.

In one embodiment, a high-strength concrete structure made in part from recycled products is provided, the high-strength concrete structure comprising: a resin component having a densified polystyrene, a monomer material, and at least one other resin material, wherein the densified polystyrene comprises between approximately 3% to 7% of a weight of the resin component, and wherein the monomer material comprises between approximately 40% to 50% of the weight of the resin component; and a dry component having an aggregate material and a sand material, wherein a weight of the aggregate material is between approximately 60% to 80% of a weight of the dry component, wherein the resin component and the dry component are combined to form a concrete material used to product the high-strength concrete structure.

In various embodiments, at least one sidewall and a bottom portion of the concrete structure form at least one of a subgrade utility vault or a utility trench. Additionally, the concrete structure can further comprise a lid made from a material that is distinct from the high-strength concrete material, wherein the lid at least partially defines a partially enclosed space with the at least one sidewall and the bottom portion. In some embodiments, the at least one other resin material is a silane material that is between approximately 40% to 55% of the weight of the resin component. In various embodiments, the monomer material is a styrene monomer that is between approximately 40% to 50% of the weight of the resin component. The concrete structure can further comprise a pigment material that is mixed with the resin component and the dry component to change a color of the concrete material.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the drawings.

The above-described embodiments, objectives, and configurations are neither complete nor exhaustive. As will be appreciated, other embodiments of the disclosure are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and claims themselves.

Any one or more aspects described herein can be combined with any other one or more aspects described herein. Any one or more features described herein can be combined with any other one or more features described herein. Any one or more embodiments described herein can be combined with any other one or more embodiments described herein.

BRIEF DESCRIPTION OF THE DRAWINGS

The accompanying drawings, which are incorporated in and constitute a part of the specification, illustrate embodiments of the disclosure and together with the Summary given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

Figure 1:
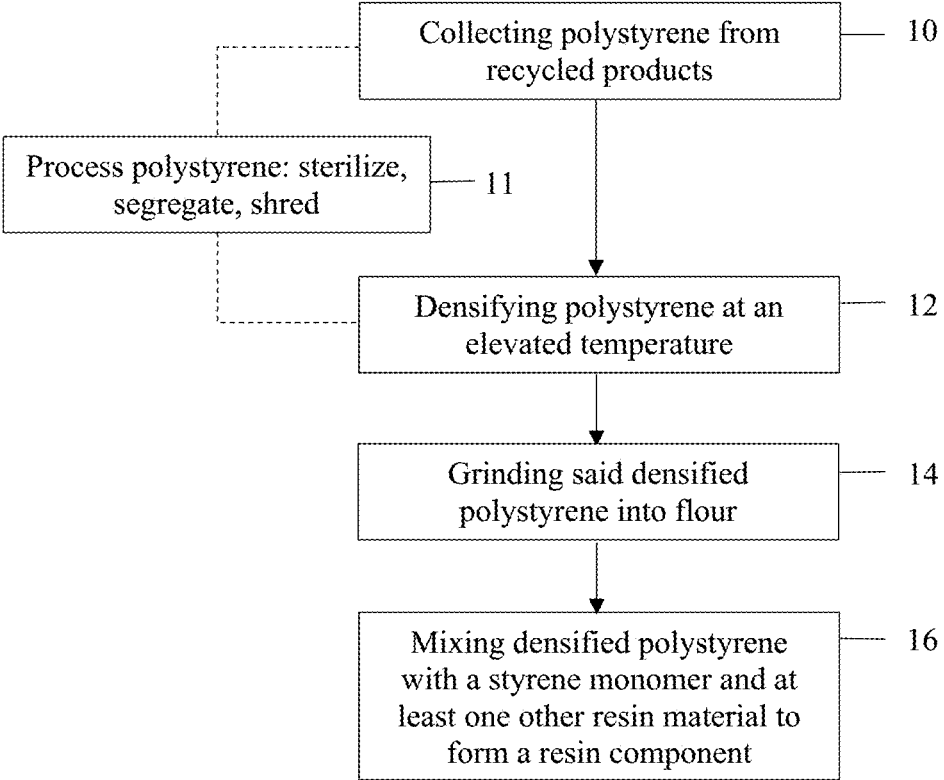
FIG. 1 is a flowchart showing the collection and densification of recycled polystyrene in accordance with an embodiment of the present disclosure.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Component No. | Component |
| --- | --- |
| 10 | Collecting Polystyrene |
| 12 | Densifying Polystyrene |
| 14 | Grinding Polystyrene |
| 16 | Mixing Polystyrene |
| 18 | Batching System |
| 20 | Resin Mixer |
| 22 | Resin Hopper |
| 24 | Dry Scale |
| 26 | Turbine Mixer |
| 28 | Releasing Dry Component |
| 30 | Mixing Resin Component |
| 32 | Releasing Pigment Material |
| 34 | Mixing Components |
| 36 | Transferring to Mold |
| 38 | Pressing Concrete Material |
| 40 | Mold |
| 42 | Upper Portion |
| 44 | Concrete Material |
| 46 | Final Concrete Product |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present disclosure are described herein and as depicted in the drawings. It is expressly understood that although the figures depict the inclusion of recycled polystyrene in a high-strength concrete and related methods and systems, the present disclosure is not limited to these embodiments.

Now referring to FIG. 1, a flowchart showing the collection and densification of recycled polystyrene is provided. As noted above, polystyrene is widely used, and can be collected 10 from a variety of sources. Polystyrene can be recovered from protective packaging, containers, lids, bottles, trays, tumblers, disposable cutlery, models, etc. These polystyrene products can be processed 11 in a number of ways. The polystyrene products can be sterilized if the products were used for food or in other ways that could potentially contaminate the polystyrene. The polystyrene products can be segregated based on characteristics such as density, color, etc. Further still, the polystyrene products can have different sizes, and therefore the polystyrene products can be shredded to standardize the sizes of individual pieces of the polystyrene.

Next, the recycled polystyrene is densified 12 at an elevated temperature to increase the density of the recycled polystyrene for use in a structural application like high-strength concrete. In addition, the densification process can remove undesirable impurities such as butane and pentane. However, if the densification process is conducted at too high of a temperature, the molecular chains of the polystyrene can break and reduce the strength of the polystyrene. Thus, there is a critical temperature or range of temperatures at which to conduct the densification process in the present disclosure. In some embodiments, the recycled polystyrene is densified at a temperature between approximately 140° C. to 160° C. In various embodiments, the recycled polystyrene is densified at a temperature of approximately 150° C. The recycled polystyrene is densified for an amount of time that is sufficient to melt all or substantially all of the recycled polystyrene. Stirring, agitating, or shaking can assist in evenly melting and heating the recycled polystyrene.

Once the recycled polystyrene is densified, the densified polystyrene is ground 14 into smaller pieces for further processing. In some embodiments, the densified polystyrene is completely ground into flour for use in a batching process, which is described in further detail below. However, it will be appreciated that the present disclosure encompasses embodiments where the densified polystyrene is simply cut or shredded into smaller pieces or not further ground or sized at all. In one embodiment, the average particle or piece size of the ground, densified polystyrene is approximately 0.25 mm, and the density of the densified polystyrene is approximately 400 kg/m$^3$. It will be appreciated that in some embodiments, the average particle or piece size is between approximately 0.15 mm to 1.0 mm, in some embodiments 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, and 1.0 mm, or a range or value between two of these values, and the density of the densified polystyrene is between approximately 350 kg/m$^3$ and 450 kg/m$^3$, in some embodiments 350 kg/m$^3$, 375 kg/m$^3$, 400 kg/m$^3$, 425 kg/m$^3$, and 450 kg/m$^3$, or a range or value between two of these values.

Next, the densified polystyrene is mixed 16 with a monomer material and at least one other resin material to form a resin component. The monomer material promotes the polymerization of the densified polystyrene and adds flexibility to the resin component. The monomer material can be, for example, a styrene monomer or a methyl methacrylate monomer. The styrene monomer has a chemical formula of C$_8$H$_8$ and molecular weight of 104.1 g/mol. The methyl methacrylate monomer has a chemical formula of C$_5$H$_8$O$_2$ and a molecular weight of 100.12 g/mol. The additional resin material can be, for example, a silane coupling agent that adds flexural and tensile strength to the resin component and concrete. The silane material can be the reaction product of vinylbenzyl chloride and ethylene diaminopropyltrimethoxysilane. Once the resin component is prepared, the resin component is mixed with a dry component to form a high-strength concrete.

Figure 2:
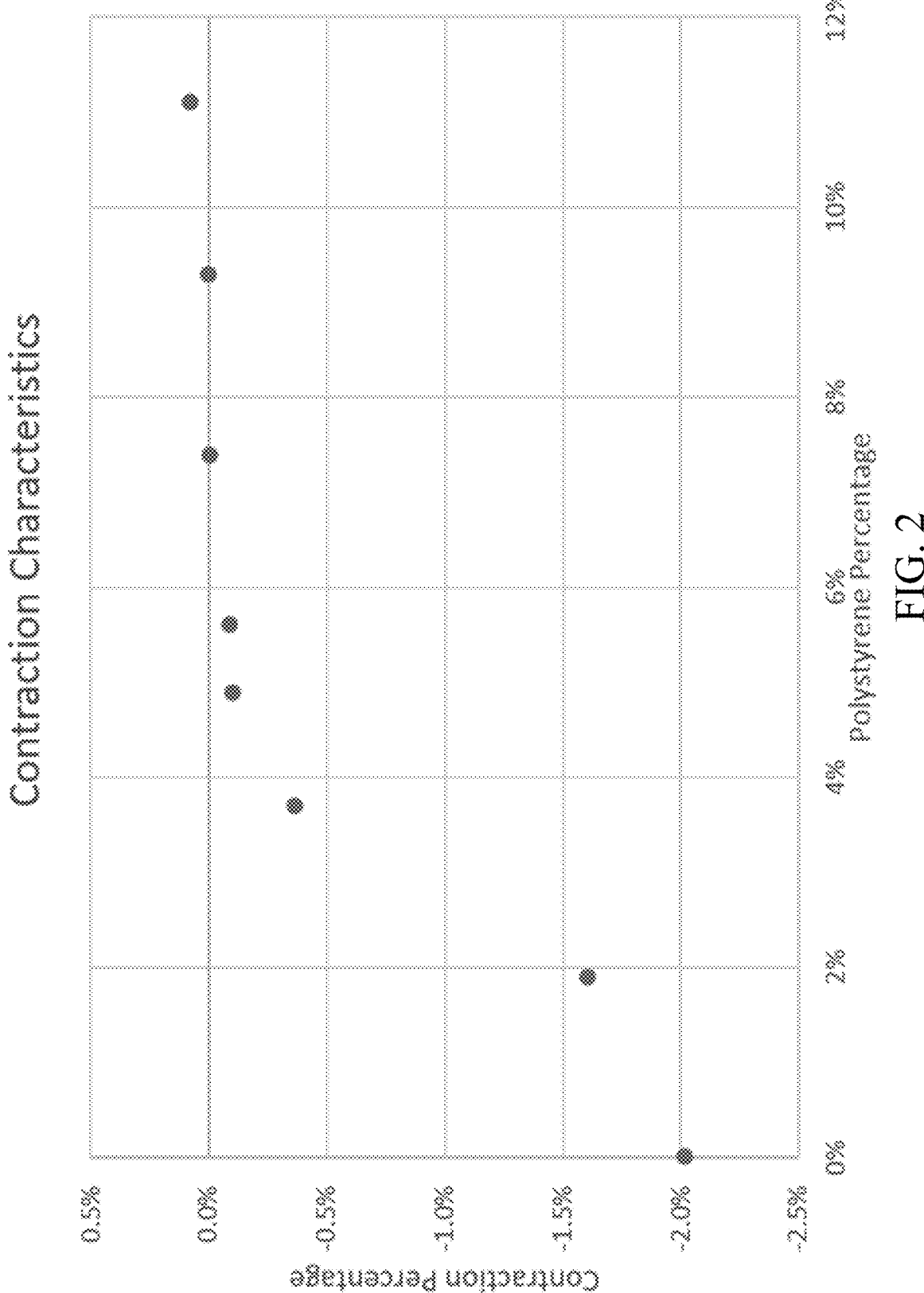
FIG. 2 is a graph showing the contraction characteristics of a concrete material based on the relative amount of polystyrene in a resin component of the concrete material in accordance with an embodiment of the present disclosure.

Now referring to FIG. 2, a graph showing the contraction characteristics of a concrete material based on the relative the concrete in the mold and potentially damage the mold. In some embodiments, the densified polystyrene comprises between approximately 3% to 7% of a weight of the resin component. In various embodiments, the densified polystyrene comprises approximately 5% of a weight of the resin component. In further embodiments, the polystyrene comprises greater than approximately 0% and less than approximately 9% of a weight of the resin component to achieve the desired contraction in the concrete material, in some embodiments 0%, 1%, 2%, 3%, 4%, 5%, 6%, 7%, 8%, and 9%, or a range or value between two of these values.

Next, relative amounts of the monomer material and the additional resin component in the resin component are also critical to ensure the proper polymerization of the densified polystyrene as well as the proper material properties and characteristics of the resulting concrete. In some embodiments, the monomer material can be between approximately 40% to 50% of a weight of the resin component, in some embodiments 40%, 42%, 45%, 47%, and 50%, or a range or value between two of these values. In various embodiments, the monomer material can be between approximately 43.6% and 49.1% of a weight of the resin component, in some embodiments 43%, 43.6%, 44%, 45%, 46%, 46%, 48%, 49.1%, and 50% or a range or value between two of these values. Similarly, in some embodiments, the additional resin material is between approximately 40% to 55% of a weight of the resin component, in some embodiments 40%, 45%, 50%, and 55%, or a range or value between two of these values. In various embodiments, the additional resin material is between approximately 45.2% to 51.0% of a weight of the resin component, in some embodiments 45%, 45.2%, 46%, 47%, 48%, 49%, 50%, and 51.0%, or a range or value between two of these values.

Various embodiments of the resin component can have differing amounts of the constituent materials within the above ranges. Table I shows the relative amounts, by weight, of densified polystyrene versus the contraction of the resulting concrete for the different embodiments, and this comparison is presented in FIG. 2. The more densified polystyrene percentage by weight, the less contraction, and after a certain point, the resulting concrete begins to expand when pressed in a mold. It will be appreciated that the present disclosure is not limited to these embodiments.

TABLE I

| | Relative amounts of materials of the resin component, by weight, and contraction of the resulting concrete material. Note that all embodiments have more resin material than monomer material. | | | | | | | |
|---|---|---|---|---|---|---|---|---|
| Material | First Emb. | Second Emb. | Third Emb. | Fourth Emb. | Fifth Emb. | Sixth Emb. | Seventh Emb. | Eighth Emb. |
| Resin Material | 48.41% | 50.93% | 49.98% | 49.04% | 48.10% | 47.15% | 46.21% | 45.27% |
| Monomer Material | 46.65% | 49.07% | 48.16% | 47.26% | 46.35% | 45.44% | 44.53% | 43.62% |
| Densified Polystyrene | 4.94% | 0.00% | 1.85% | 3.70% | 5.56% | 7.41% | 9.26% | 11.11% |
| Contraction | −0.097% | −2.02% | −1.60% | −0.36% | −0.09% | −0.008% | 0.005% | 0.080% | amount of densified polystyrene in the resin component is provided. The relative amounts and composition of the resin component is critical to producing the desired characteristics of the resulting concrete material as well as the contraction during a molding process. As described above, a small amount of contraction is desirable to help remove the concrete from a mold, but too much contraction will warp the outer surface of the concrete and expansion will lodge As described elsewhere herein, the resin component is mixed with a dry component to form the high-strength concrete, and the dry component can be made from constituent materials in specific proportions that ensure proper mixing with the resin component and resulting material properties of the high-strength concrete. In some embodiments, an aggregate material is between approximately 60% to 80% of a weight of the dry component. In various embodiments, a sand material is between approximately 20% to 40% of a weight of the dry component. Table II is presented below to show the different amounts of the materials used to make the high-strength concrete where the amounts are within the above ranges. The embodiments in Table II correspond to the embodiments in Table I and, again, the present disclosure is not limited to these embodiments. Moreover, while absolute values are presented in Table II, the relative amounts between the various materials can be established to produce more or less concrete in a batch or to product concrete in a continuous manner. The catalyst can be Norox® (Di(4-tert·butylcyclohexyl)peroxydicarbonate) in some embodiments, and the BPO or benzoyl peroxide $((BzO)_2)$ can be used to aerate the concrete material.

The constituent materials of the resin component are mixed 30 in the resin hopper. To begin, the monomer material is poured into the resin hopper and the resin mixer begins to turn. This action can take approximately 1 minute. Next, the densified polystyrene is moved via a venturi tube into the resin hopper. The resin mixer is turned off for the last pound of the densified polystyrene, and then the resin mixer is restarted. This action can take approximately 7 minutes. Then, the resin material is moved into the resin hopper with the resin mixer still turning its one or more blades to mix the different materials together. This action can take approximately 1 minute. Various other materials are added to the resin hopper while the resin mixer is still turning. A silane coupling agent such as XIAMETER™ OFS-6032 Silane, a catalyst (e.g., Perkadox LW75 or dibenzoyl peroxide),

TABLE II

Amounts of materials of the resin component and dry component.

| Material | First Emb. | Second Emb. | Third Emb. | Fourth Emb. | Fifth Emb. | Sixth Emb. | Seventh Emb. | Eighth Emb. |
|---|---|---|---|---|---|---|---|---|
| Resin Material | 130.71 g | 137.50 g | 134.96 g | 132.41 g | 129.86 g | 127.32 g | 124.77 g | 122.22 g |
| Monomer Material | 125.95 g | 132.50 g | 130.04 g | 127.59 g | 125.14 g | 122.68 g | 120.23 g | 117.78 g |
| Densified Polystyrene | 13.34 g | 0.00 g | 5.00 g | 10.00 g | 15.00 g | 20.00 g | 25.00 g | 30.00 g |
| Aggregate Material | 450 g | 450 g | 450 g | 450 g | 450 g | 450 g | 450 g | 450 g |
| Sand Material | 200 g | 200 g | 200 g | 200 g | 200 g | 200 g | 200 g | 200 g |
| Catalyst | 0.48 g | 0.50 g | 0.49 g | 0.49 g | 0.48 g | 0.47 g | 0.46 g | 0.45 g |
| Benzoyl Peroxide | 1.14 g | 1.20 g | 1.18 g | 1.17 g | 1.14 g | 1.12 g | 1.09 g | 1.08 g |

Figure 3:
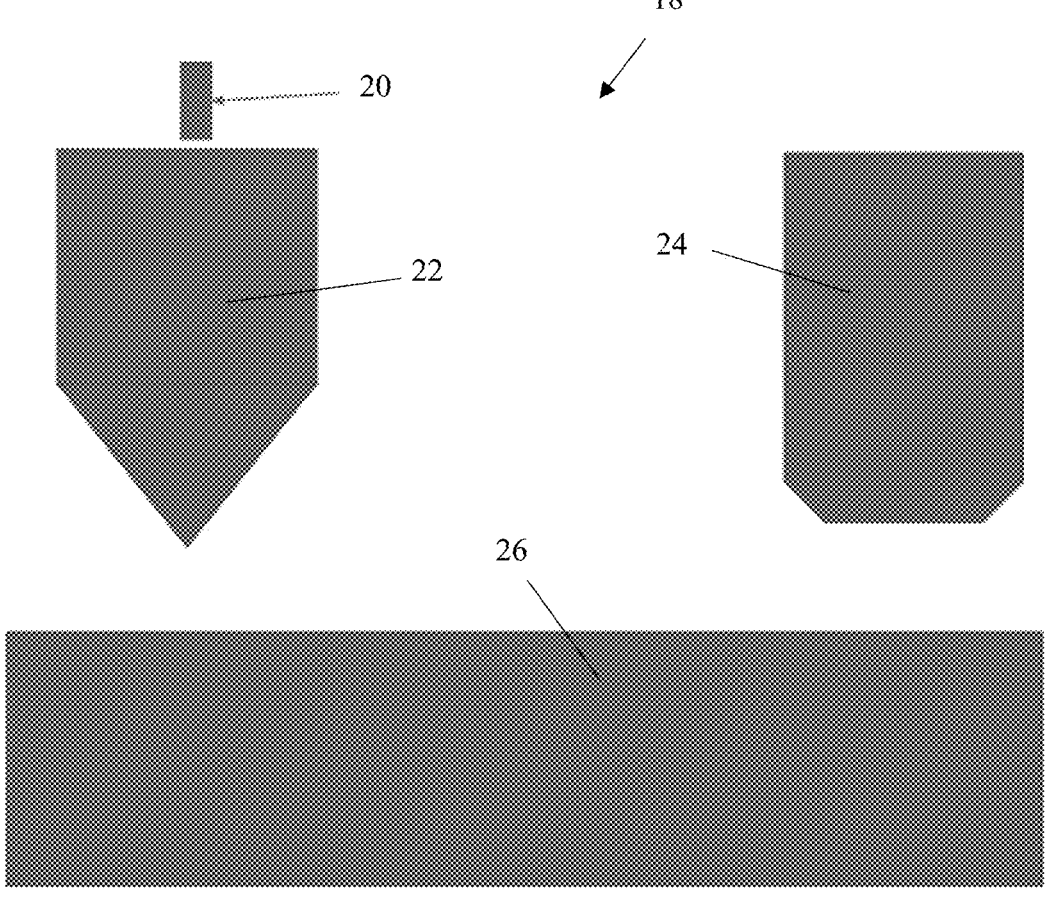
FIG. 3 is a side elevation view of components of a batching system in accordance with an embodiment of the present disclosure.

Now referring to FIG. 3, a side elevation view of components of a batching system 18 is provided. The batching system 18 has a resin hopper 22 with a resin mixer 20 that can include one or more blades to physically mix or churn different constituent materials of the resin component, and the resin hopper 22 holds the resin component prior to combination with a dry component. A dry scale 24 can collect the constituent materials of the dry component, and in some embodiments, the dry scale 24 can simply weigh the materials prior to release into a turbine mixer 26. The turbine mixer 26 is positioned below the resin hopper 22 and the dry scale 24, and the turbine mixer 26 can have at least one blade to mix the resin and dry components together. However, it will be appreciated that the present disclosure encompasses other systems to mix resin and dry components as well as other processes than the batching process described below.

Figure 4:
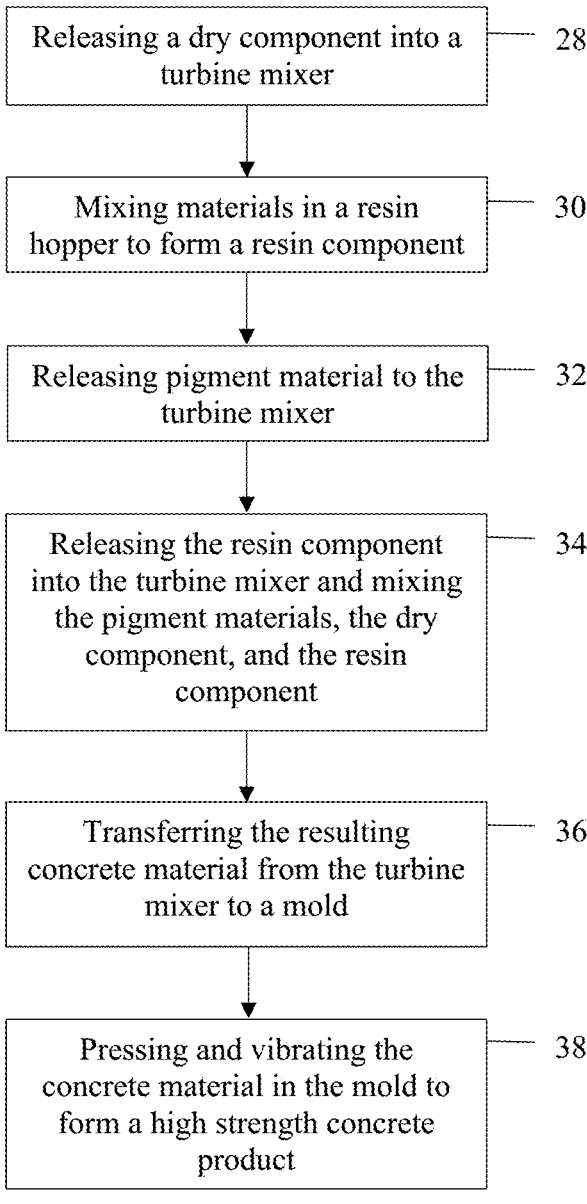
FIG. 4 is a flowchart showing an exemplary batching process in accordance with an embodiment of the present disclosure.

Now referring to FIG. 4, a flowchart of an exemplary batching process 28 is provided. Each action can be performed automatically or manually, and the actions can be performed in any order, in series, or in parallel. First, the constituent materials of the dry component are weighed in the dry scale and released 28 into the turbine mixer. An aggregate material is released into the turbine mixer, which turns three rotations. This action can take approximately 2 minutes. Next, a sand material is moved into the dry scale via a conveyor and released into the turbine mixer, which turns three rotations. This action can take approximately 2 minutes. Finally, a silica granular or powder material is moved into the dry scale via one or more augers and released into the turbine mixer, which turns in multiple rotations to advance the material from one position to another. This action can take approximately 1.5 minutes.

another catalyst (e.g., Norox 600 CL2 or di(4-tert·butylcyclohexyl)peroxydicarbonate), and/or hydroquinone can be added to the resin hopper. This action can take approximately 2 minutes.

A pigment material or materials can be released 32 into the turbine mixer to add color to the final concrete product. Next, the resin component is released 34 into the turbine mixer to mix with the pigment material and the dry component for approximately 45 seconds. Then, the concrete material is released from the turbine mixer into a hopper or other container where the concrete material is transferred 36 to a mold.

The concrete material is poured into a mold, and a motor can vibrate the mold and remove air from the concrete material. Then, an upper portion of the mold presses 38 on the concrete material in the mold with a force that can be constant, varying, etc. The motor can still induce a vibration while the upper portion presses with the force. Then, the motor stops vibrating, and the upper portion continues to apply the force for approximately 8 minutes. The upper portion moves away, and the concrete product is removed from the mold. The concrete product, such as a subgrade utility vault, utility trench, etc., is inspected and the mold is cleaned for the next batch of concrete material.

Figure 5A:
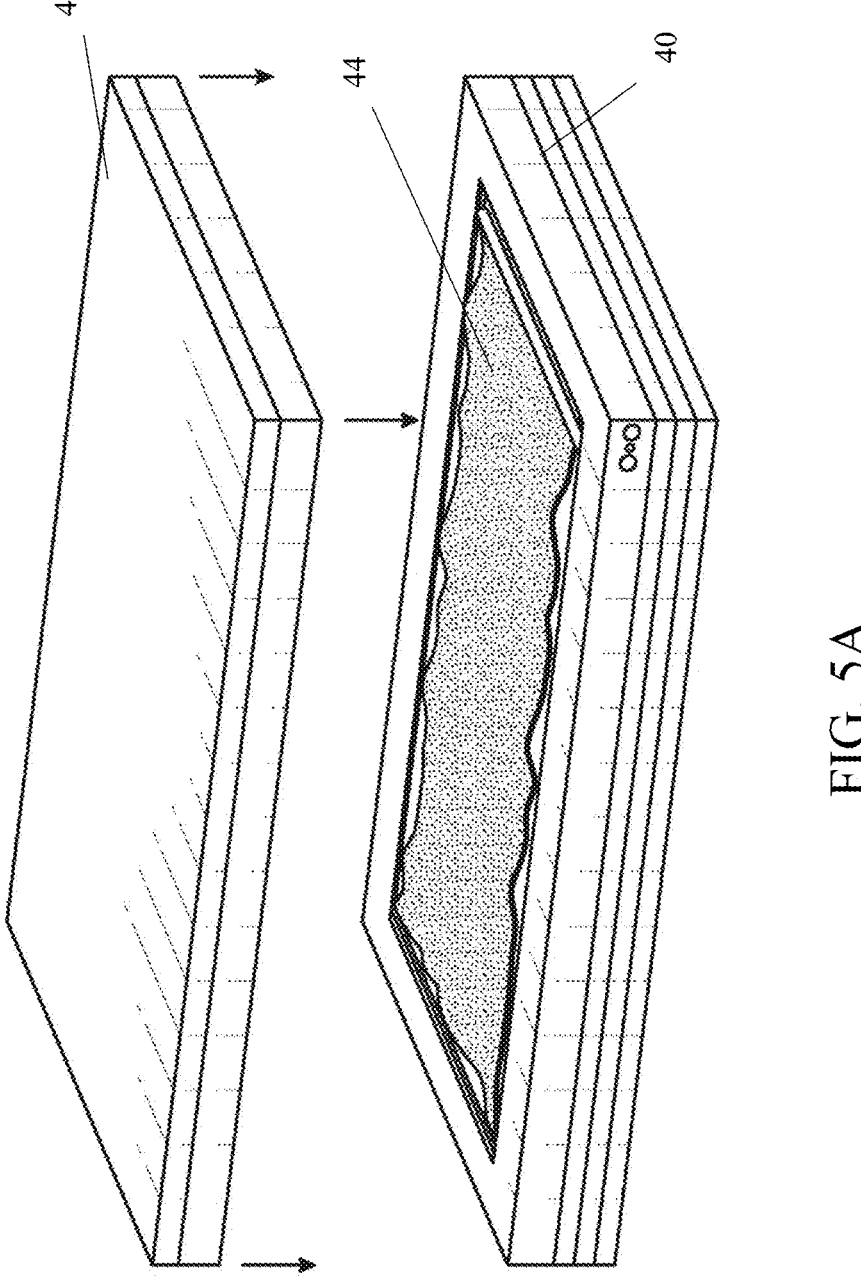
FIG. 5A is a perspective view of a mold in an initial state in accordance with an embodiment of the present disclosure.
Figure 5B:
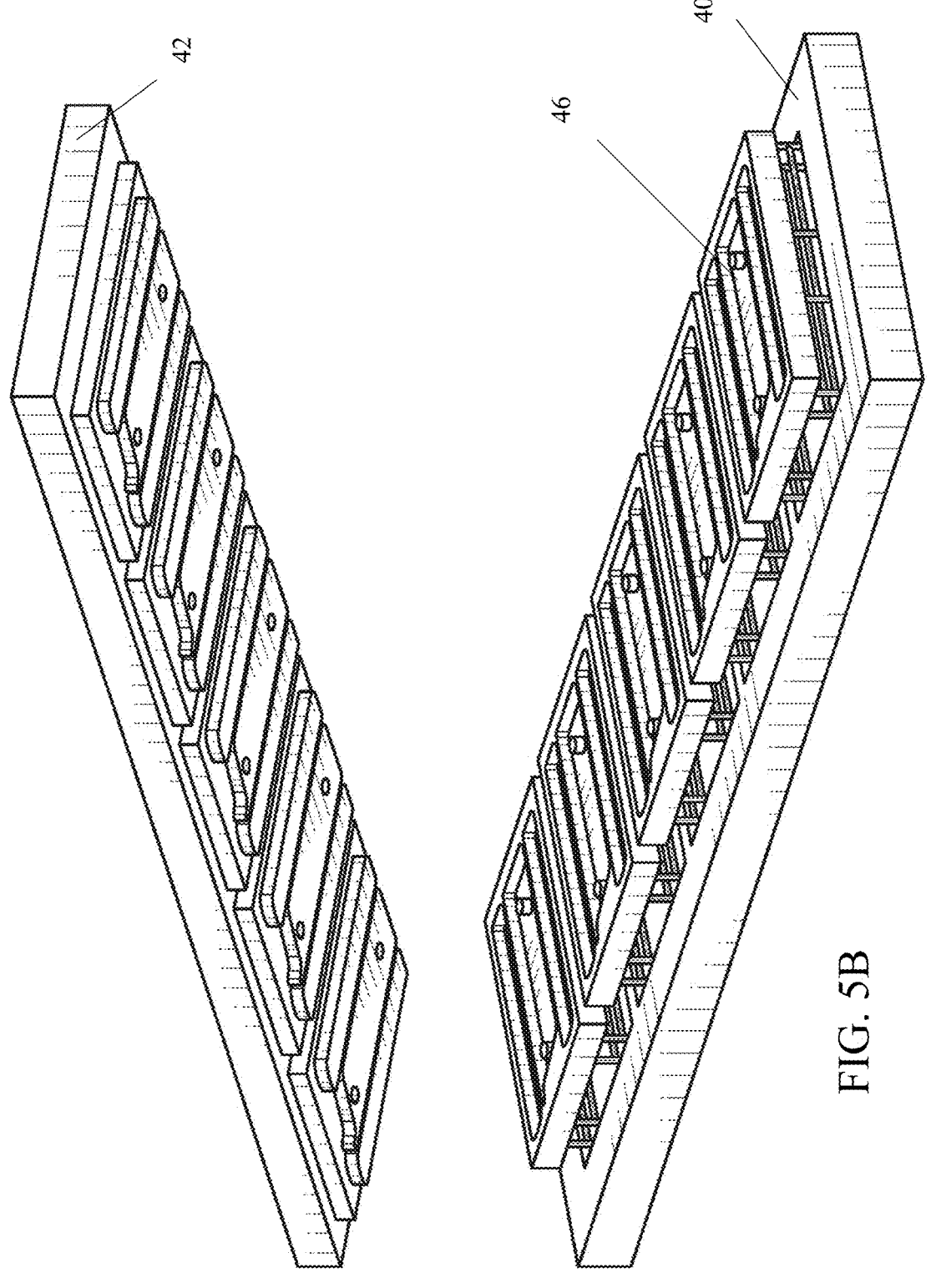
FIG. 5B is a perspective view of the mold in FIG. 5B in a final state in accordance with an embodiment of the present disclosure.

Now referring to FIGS. 5A and 5B, a mold 40 is provided in an initial state and a final state, respectively. In FIG. 5A, the concrete material 44 is poured into the mold 40, and an upper portion 42 of the mold 40 descends and imposes a force on the concrete material 44. Then, as shown in FIG. 5B, the result is a concrete product 46 that is lightweight and incorporates recycled polystyrene.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

Any one or more aspects described herein can be combined with any other one or more aspects described herein. Any one or more features described herein can be combined with any other one or more features described herein. Any one or more embodiments described herein can be combined with any other one or more embodiments described herein.

What is claimed is:

1. A method of manufacturing high-strength concrete with recycled polystyrene, comprising:

collecting polystyrene from recycled products;

densifying said polystyrene at an elevated temperature between 140° C. to 160° C. to melt said polystyrene and to increase a density of said polystyrene;

mixing said densified polystyrene with a monomer material and at least one other resin material to form a resin component, wherein said densified polystyrene is present in said resin component in an amount of between 3% to 7% by weight, wherein said monomer material is present in said resin component in an amount of between 40% to 50% by weight, and wherein said at least one other resin material is a silane material that is present in said resin component in an amount of between 40% to 55% by weight; and mixing said resin component with a dry component to form a high-strength concrete, wherein said dry component comprises an aggregate material and a sand material, and said aggregate material is between 60% to 80% of a weight of said dry component.

2. The method of claim 1, wherein said elevated temperature is 150° C., and wherein said densified polystyrene is present in said resin component in an amount of 5% by weight.

3. The method of claim 1, further comprising grinding said densified polystyrene into flour with an average particle size of between 0.15 mm to 1.0 mm.

4. A method of manufacturing a high-strength concrete product with recycled polystyrene, comprising:

densifying recycled polystyrene at an elevated temperature between 140° C. and 160° C. to melt said polystyrene and to increase a density of said polystyrene;

mixing said densified polystyrene, a monomer material, and at least one other resin material in a hopper to form a resin component, wherein said densified polystyrene is present in said resin component in an amount of between 3% to 7% by weight, wherein said monomer material is present in said resin component in an amount of between 40% to 50% by weight, and wherein said at least one other resin material is a silane material that is present in said resin component in an amount of between 40% to 55% by weight;

mixing an aggregate material and a sand material to form a dry component, wherein a weight of said aggregate material is between 60% to 80% of a weight of said dry component;

mixing said resin component and said dry component in a turbine mixer to form a concrete material; and pressing said concrete material in a mold to produce said high-strength concrete product.

5. The method of claim 4, further comprising mixing said densified polystyrene, said monomer material, and said at least one other resin material in said hopper for 45 seconds.

6. The method of claim 4, further comprising mixing a polymerization catalyst and a coupling agent into said resin component in said hopper for at least 60 seconds.

7. The method of claim 4, wherein said elevated temperature is 150° C., said densified polystyrene is present in said resin component in an amount of 5% by weight.

8. A high-strength concrete structure made in part from recycled products, comprising:

a resin component having a densified polystyrene, a monomer material, and at least one other resin material, wherein said densified polystyrene is present in said resin component in an amount of between 3% to 7% by weight, wherein said monomer material is present in said resin component in an amount of between 40% to 50% by weight, and wherein said at least one other resin material is a silane material that is present in said resin component in an amount of between 40% to 55% by weight; and a dry component having an aggregate material and a sand material, wherein a weight of said aggregate material is between 60% to 80% of a weight of said dry component, and wherein said resin component and said dry component are combined to form a concrete material used to produce said high-strength concrete structure.

9. The high-strength concrete structure of claim 8, wherein at least one sidewall and a bottom portion of said high-strength concrete structure form at least one of a subgrade utility vault or a utility trench.

10. The high-strength concrete structure of claim 9, further comprising a lid made from a material that is distinct from said concrete material, wherein said lid at least partially defines a partially enclosed space with said at least one sidewall and said bottom portion.

11. The high-strength concrete structure of claim 8, wherein said monomer material is a styrene monomer that is between 40% to 50% of said weight of said resin component.

12. The high-strength concrete structure of claim 8, further comprising a pigment material that is mixed with said resin component and said dry component to change a color of said concrete material.

13. The high-strength concrete structure of claim 8, wherein said densified polystyrene is densified at a temperature between 140° C. and 160° C.

14. The high-strength concrete structure of claim 8, wherein said densified polystyrene has an average particle size of between 0.15 mm to 1.0 mm.

15. The high-strength concrete structure of claim 8, wherein said densified polystyrene has a density between 350 kg/m$^3$ and 450 kg/m$^3$.

16. The high-strength concrete structure of claim 8, wherein the monomer material is one of a styrene monomer or a methyl methacrylate monomer.

17. The high-strength concrete structure of claim 8, wherein said densified polystyrene is present in said resin component in an amount of 5% by weight.

18. The high-strength concrete structure of claim 8, wherein a weight of said sand material is between 20% and 40% of said weight of said dry component.

19. The high-strength concrete structure of claim 8, wherein the resin component comprises a polymerization catalyst.

20. A high-strength concrete structure made in part from recycled products, comprising:

a resin component having a densified polystyrene, a monomer material, a catalyst material, and at least one other resin material, wherein said densified polystyrene is present in said resin component in an amount of between 3% to 7% by weight, wherein said monomer material is present in said resin component in an amount of between 40% to 50% by weight, and wherein said at least one other resin material is present in said resin component in an amount of between 40% to 55% by weight; and a dry component having an aggregate material and a sand material, wherein said resin component and said dry component are combined to form a concrete material used to produce said high-strength concrete structure.

* * * * *